March 2, 1937.  E. L. BARRETT ET AL  2,072,578
VIBRATORY MOTOR DEVICE
Filed Dec. 5, 1935   3 Sheets-Sheet 1
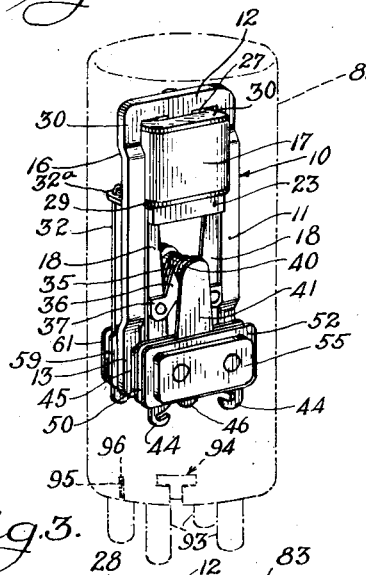
Fig. 1.
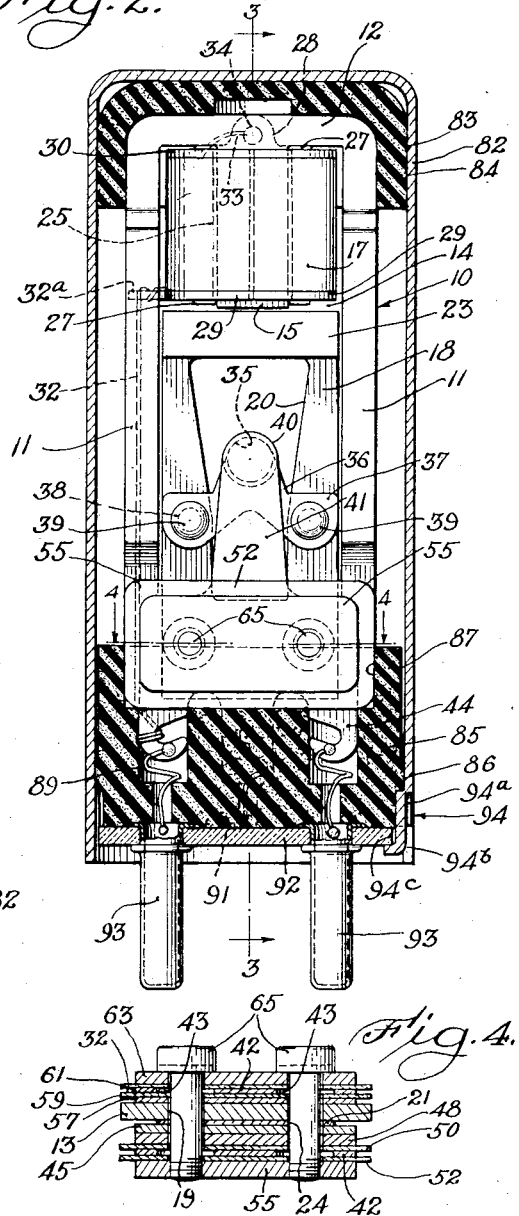
Fig. 2.
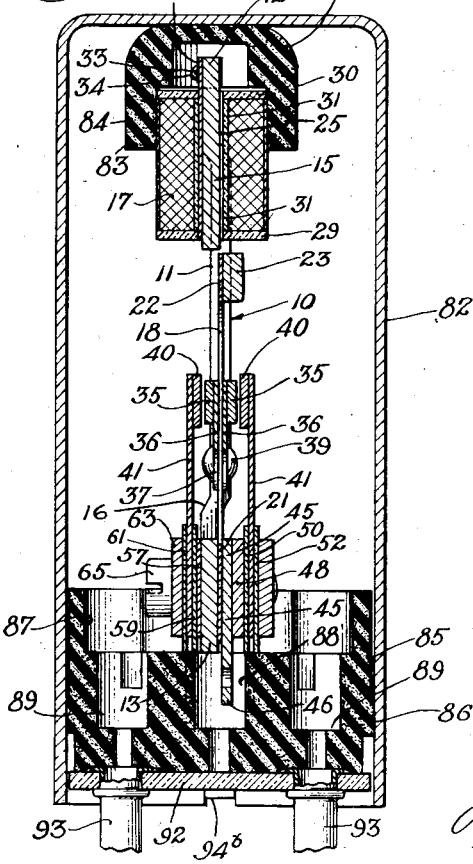
Fig. 3.
Fig. 4.
Inventors;
Edward L. Barrett
and Max J. Manahan
By Parker, Carton, Pitzner & Hubbard
Attorneys.

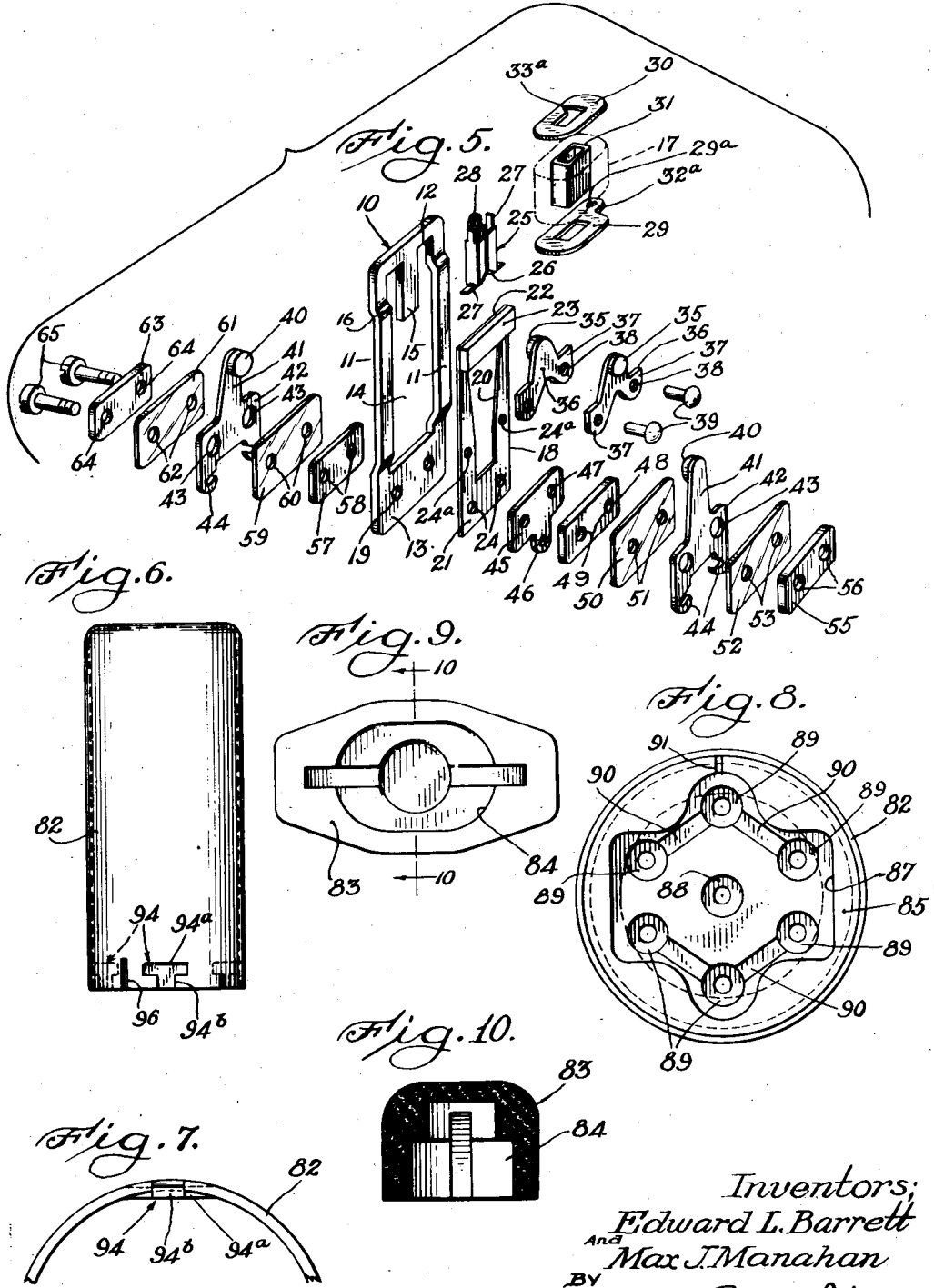

March 2, 1937.    E. L. BARRETT ET AL    2,072,578
VIBRATORY MOTOR DEVICE
Filed Dec. 5, 1935    3 Sheets-Sheet 3
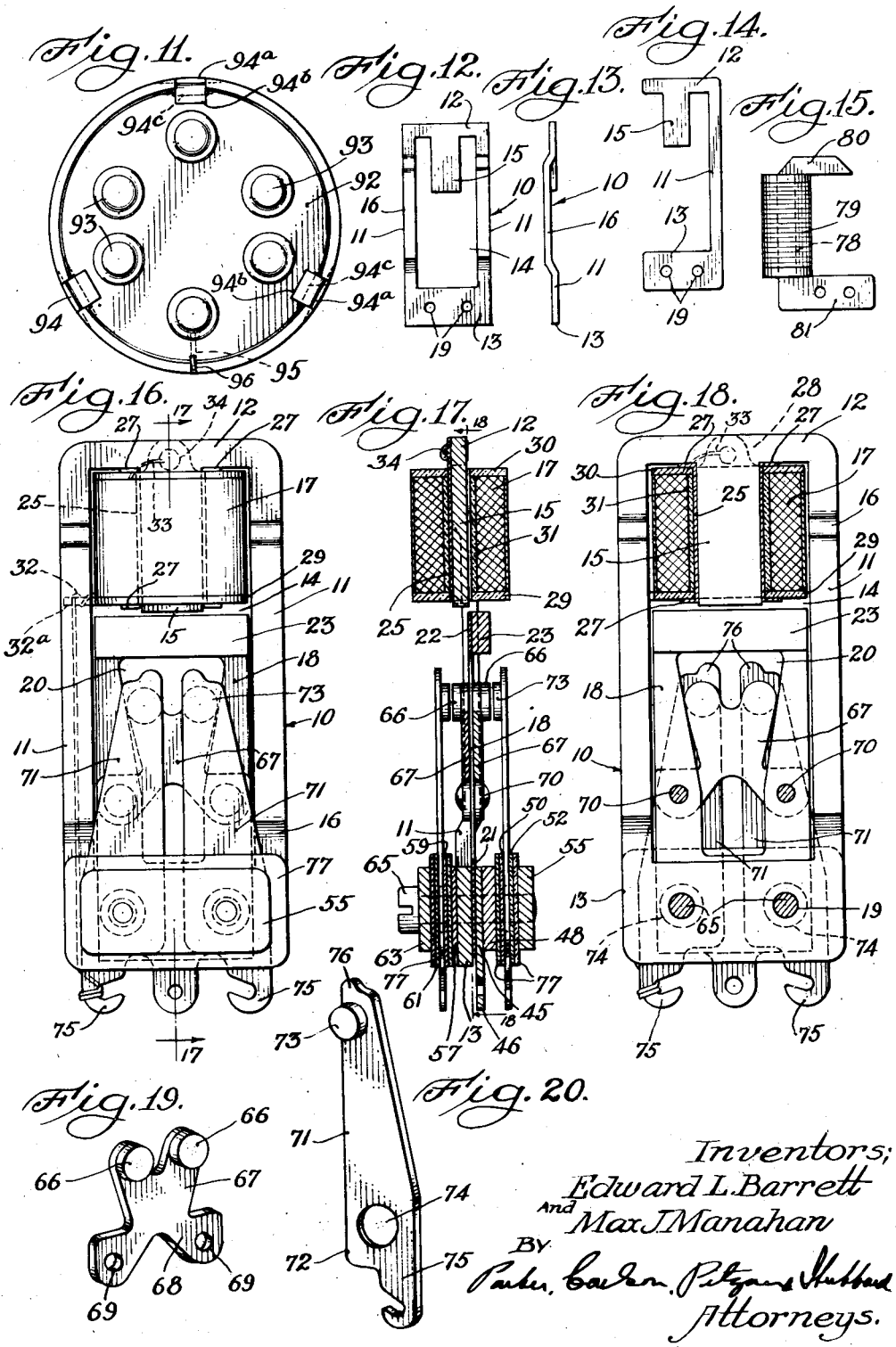
Inventors;
Edward L. Barrett
And Max J. Manahan
BY
Parker, Carter, Pitzner & Hubbard
Attorneys.

Patented Mar. 2, 1937

2,072,578

UNITED STATES PATENT OFFICE 2,072,578

VIBRATORY MOTOR DEVICE

Edward L. Barrett, La Grange, Ill., and Max J. Manahan, Mount Vernon, N. Y., assignors to Utah Radio Products Company, Chicago, Ill., a corporation of Illinois Application December 5, 1935, Serial No. 52,987

24 Claims. (Cl. 200—90)

The invention relates generally to vibratory motor devices and more particularly to devices of this character which are especially well adapted for use as a circuit interrupting means in electrical systems for transforming direct current into alternating current and thence into direct current, such systems for example being largely employed at present in providing electrical energy of proper potential for the operation of a motor vehicle installation of a radio receiving set.

A general object of the invention is to provide a new and improved device of this nature which is relatively quite small in its overall dimensions, and in which the component parts have been reduced to such simple form and structure as to produce a device which may be readily and cheaply manufactured without loss of accuracy or operating efficiency.

Another object is to produce a vibratory motor in which the supporting frame is a flat member capable of being readily produced from sheet metal stock by a simple stamping operation.

Another object is to provide a vibratory motor in which all of the elements of the frame, including the pole piece of the driving electromagnetic winding, are located in the same plane and in which a vibratory reed extends along such plane for movement in a direction transversely thereof.

Another object is to provide an improved motor having a novel relationship of frame and armature for improving the operating efficiency of the motor.

Another object is to provide in such a device a novel relationship of electromagnetic winding core, frame and armature whereby a relatively short, substantially closed magnetic flux path is provided with resulting high operating efficiency.

Further objects reside in the provision in a motor of this type of novel means for assembling the parts together, more particularly the frame, reed and contact members and the frame and electromagnetic winding, and in providing means whereby adjustment of the cooperating contacts may be conveniently and expeditiously effected.

Another object is to provide a novel vibratory motor structure in which motors of the synchronous or non-synchronous types may be selectively produced utilizing the same basic structure in combination with a contact point assembly for one or the other of said types, whereby simplicity and economy of manufacture is attained through the elimination of a large number of separate parts for each type with attendant tools, dies, fixtures and assembly operations.

Another object is to provide a novel construction whereby desired flexing characteristics are produced in a reed which is supported from one end.

Other objects are to provide new and improved means for supporting the motor to prevent or minimize sound and mechanical vibrations, and for connecting the motor in an assembled unit.

Other objects and advantages will become apparent in the following description and from the accompanying drawings, in which:

Figure 1 is a perspective view on a reduced scale of a vibratory motor device of the non-synchronous type embodying the features of the invention, the enclosing case therefor being shown in broken outline.

Fig. 2 is a longitudinal section through a vibratory motor assembly, the motor being shown in elevation.

Fig. 3 is a longitudinal sectional view through the motor assembly, taken as indicated by the line 3—3 of Fig. 2.

Fig. 4 is a transverse section through one end of the motor assembly, taken as indicated by the line 4—4 of Fig. 2.

Fig. 5 is an extended view showing the parts of a motor assembly in perspective.

Fig. 6 is a side view of a part of the enclosing case.

Fig. 7 is a fragmentary end view of said case.

Figs. 8 and 9 are inside end face views of the resilient motor supporting members respectively for the open and closed ends of the case shown in Fig. 7.

Fig. 10 is a transverse section through the supporting member shown in Fig. 9 and is taken substantially along line 10—10 of that figure.

Fig. 11 is an outer face view of the open end of the case and closure therefor.

Figs. 12 and 13 are respectively face and side views of the frame for the motor device.

Figs. 14 and 15 show face views of modified forms of the frame, and in Fig. 15 an energizing winding is shown somewhat diagrammatically.

Fig. 16 is a front elevation of a vibratory motor device of the synchronous type.

Fig. 17 is a central sectional view through said device taken along the line 17—17 of Fig. 16.

Fig. 18 is a sectional view taken generally through the plane of the frame as indicated by the line 18—18 of Fig. 17.

Figs. 19 and 20 are, respectively, perspective views of one of the movable and one of the fixed contact supporting members for the synchronous type motors.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

With reference to the vibratory motor structure per se, the organization in general embodies a frame which supports a vibratory member or reed, fixed contacts for cooperation with movable contacts carried by the reed, and an electromagnetic winding for driving said reed. A feature of the invention is the provision of a basic assembly of parts from which, by the addition of the proper arrangement of cooperating contacts, any one of a number of different types and kinds of motors can be produced. This basic assembly includes the frame, electromagnetic winding, vibratory reed and the members by which these parts, together with the selected cooperating contacts, are united. While frame constructions other than that shown and described herein may be employed as the foundation of such a basic assembly, the simple inexpensive frame employed in the present construction is eminently suitable in all respects.

The frame is preferably a one-piece structure which includes a part for supporting the reed and contacts and another part constituting the core of the winding, these parts all being located substantially on the same plane. Such a frame may be readily and economically produced from a flat sheet of metal stock by a simple stamping operation. The frame is preferably fashioned of such highly magnetic permeable material as cold rolled steel but other materials, such as brass or copper, may be used, although since the core must be of a magnetic permeable material, provision must then be made for establishing an operating magnetic flux path.

Referring to Figs. 2, 3, 5, and particularly Figs. 12 and 13, a preferred form of frame 10 is shown as comprising an elongated rectangularly shaped member fashioned from relatively light steel stock by a stamping operation. The frame has narrow side members 11, an end member 12 of approximately the same width, and an opposed wider end member 13. These members define an open center structure, the opening being identified by the numeral 14. Projecting from the narrow end member 12 and preferably extending into the center opening 14 is a core 15 which is integral with the end member and is readily formed in the stamping operation. As may be seen in Fig. 13, all of the elements of the frame are thus located on the same plane. However, for a purpose which will be hereinafter explained, it is preferred that both of the side members 11 be slightly offset, as indicated at 16, out of the plane of the frame.

The core 15 is adapted to receive and support an electromagnet winding 17, while the wider end member 13 is adapted to support the vibratory reed 18 and the cooperative contact structures, and for this purpose is provided with a pair of apertures 19 through which securing means may pass.

The vibratory reed is of the cantilever type and preferably is fashioned so that it will have flexing characteristics along its length beyond the supported end thereof which have been found eminently desirable, and which permit the use of a reed of substantially smaller dimensions than would otherwise be possible. Thus, the reed should flex initially adjacent to its supported end so that minimum movement of the reed as a whole will close relatively widely spaced cooperating contacts. However, it is desirable that the contacts remain closed as long as possible to maintain a high time efficiency. The outer portion of the reed beyond the contacts carried thereby may, therefore, be fashioned to flex substantially uniformly and more readily than the other or inner portion so that the reed and armature, after the contacts have closed, may have substantial continued movement in overcoming their inertia and thus hold the contacts closed an appreciable interval while smoothly changing the direction of vibratory movement.

Referring to Figs. 2, 3, and 5, a preferred form of reed 18 comprises an elongated member fashioned of a suitable resilient material, such as spring steel or bronze. The reed is dimensioned longitudinally to extend from substantially the outer edge of the end member 13 nearly, but not quite, to the end face of the core 15, and in width preferably to extend almost completely across the center opening 14 with as small a clearance between the sides of the reed and the adjacent side frame members 11 as is practical. The reed has a longitudinally extending central opening 20 dimensioned lengthwise to provide what may be termed a fixed end portion 21, and a narrow opposite end portion 22, the latter being the movable end of the reed. The end portion 22 carries a magnetizable armature 23, spot welded or otherwise suitably secured thereto, while the end portion 21 is provided with apertures 24 disposed for registration with the apertures 19 in the frame.

The desired flexing characteristics of the reed are in this instance obtained by forming the end margins of the opening 20 substantially parallel with the side margins extending in approximate parallelism from the end portion 21 for a distance about equal to one-third of the length of the opening. The attachment of the reed carried contacts is, in this embodiment, at this point and the reed is provided with transversely alined apertures 24ª (Fig. 5) for this purpose. Beyond the parallel portions of the side margins, both slope outwardly to provide a gradual enlargement of the opening.

The shape of the inner portion of the reed insures that the initial bending of the free reed will occur substantially adjacent to the fixed end thereof and the shape of the outer portion causes a ready flexing of the reed beyond the contacts and after the contacts have engaged. The shape and dimensions of the opening 20 may be otherwise than shown, but the reed should be weakened by properly reducing the cross sectional area to produce the desired results. In some instances, it may be advisable to weaken the reed to produce the required flexure at one or the other of the reed portions but not both.

The electromagnetic winding unit and the assembly thereof on the frame is best shown in Figs. 2, 3, and 5. The winding 17 conventionally comprises a suitable number of turns of fine copper wire, wound in this instance on a spool or bobbin of novel construction. To support the winding centrally, a piece of relatively thin gauge sheet metal is bent to provide a tubular member or sleeve 25 (Fig. 5) of rectangular cross section conforming to that of the core 15 and dimensioned to fit snugly thereover. The meeting edges of the bent sheet are located substantially on the center line of one of the wider sides and the corners at the inner end of the sleeve are turned slightly inwardly, as indicated at 26, resiliently to grip the core in assembly. At both ends the narrower sides are extended to form fingers 27 and the outer end has an apertured nib 28 extending in the plane of the closed wider side.

The fingers 27 are adapted to be bent outwardly at right angles to the sleeve body to prevent outward movement of an inner spool end 29 and an outer spool end 30 which are apertured to fit snugly about the sleeve. In assembly, one pair of fingers is turned outwardly, both spool ends slipped over the sleeve and the other pair of fingers turned outwardly. The spool ends are separated and a layer of paper 31 or the like is wound about the sleeve, the layer being amply wide to abut the opposed spool ends and perhaps turn slightly outwardly to fillet the corners and hold the spool ends apart. The coil is wound on the spool thus formed and an outer layer of paper placed thereabout.

The outer end 32 (Figs. 1 and 2) of the winding is led from the coil to pass through an aperture 29ª formed in a projection 32ª which extends endwise from a corner of the inner spool end 29. The inner end 33 of the winding is extended through a slot 33ª (Fig. 5) in the outer spool end at a point near the nib 28. In mounting the winding unit on the core 15, the sleeve is slipped over the core until the adjacent fingers 27 abut the inner side of the frame end 12. The nib 28 is thereby brought into face to face abutment with the frame end 12 and the parts are firmly united as by a spot of solder 34. By the same means, the winding end 33 may be conveniently grounded to the frame. The projection 32ª is arranged to extend across the adjacent frame side member 11 (the offset 16 providing clearance) and the winding end 32 engages the projection aperture at a point approximately over the longitudinal center line of the frame side.

The structure heretofore described comprises the major portion of the basic assembly in which the cooperating sets of contacts may be incorporated, as will become apparent, to form motor units for operation in conjunction with various circuits. In vibratory motors of the character to which this invention relates particularly, the reed carries one or more contacts (which may be designated movable contacts) for cooperation with a like number of cooperatively related contacts (to be identified as fixed contacts).

The number of sets of cooperating movable and fixed contacts employed will depend on the character of the system in which the motor is to be connected. If the system is one in which only mechanical interruption of the transformer primary circuit is required, one set of contacts or two alternately engageable sets will be used to produce respectively half wave or full wave interruption. A motor for this purpose may be characterized as being of a non-synchronous type. If the motor is to be used in a system to effect mechanical interruption of the transformer primary circuit and simultaneous rectification of the alternating current from the secondary circuit, the motor will be provided not only with the previously mentioned contacts for controlling the primary circuit, but with additional cooperating contacts arranged to be engaged substantially simultaneously with the engagement of the primary circuit controlling contacts. Such a motor, in distinction from the first mentioned type, may be characterized as being of a synchronous type.

Obviously a number of combinations of sets of cooperating contacts may be made to meet different circuit requirements but herein only two types of motors have been illustrated, namely, a full wave non-synchronous type (Figs. 1, 2, 3, and 5) and a full wave interruption, full wave rectification synchronous type (Figs. 16 to 20 inclusive). The contact structure of the non-synchronous motor will be considered first. As best seen in Fig. 5, a movable contact point 35 is affixed, as by spinning, welding or like operation, to the end of a movable contact arm 36 of relatively stiff but resilient current conducting material. The arm flares from the attached point and terminates in oppositely and transversely extending projections 37 which are dimensioned to span the central reed opening 20 and overlap the spaced reed sides. The projections have apertures 38 therein positioned to be brought into registration with the apertures 24ª in the reed. In the motor for full wave interruption a pair of such contact point and arm structures is employed, disposed one on each side face of the reed. Rivets 39 or the like, through the registered apertures 38 and 24ª, secure the parts permanently together to form a complete reed sub-assembly (see Fig. 3). While each contact point is, therefore, individually mounted, the contacts are nevertheless electrically connected and are axially alined to provide in effect a double contact which faces in opposite directions from the reed.

To avoid interference with the natural frequency of vibration of the reed, the contact structures should not be allowed to touch freely at their outer ends since the vibration induced therein as the reed swings will cause the touching parts to vibrate between themselves or buzz. Therefore, the contact structures should be spaced without touching or should be suitably secured together. The former method is preferred as the thickness of the reed serves to space the contacts.

Each movable contact point 35 is arranged for cooperation with a fixed contact point 40. Referring to Figs. 3 and 5, each fixed contact point is secured to the end of a supporting finger 41 fashioned of relatively heavy, resilient and bendable current conducting stock. At its other end, the finger has an enlarged base 42 having an area smaller than that of the frame end 13. Spaced apertures 43 in the base are disposed to be brought into registration with the apertures 19 in the frame end 13 but are larger in diameter. Extending from the base are one or more terminal lugs 44 for connection with electrical conductors, which lugs also serve as position locating means in assembling the parts. Two of the fixed contacts are of course used in the present motor and these contacts are disposed, each in cooperative opposition to a movable contact 35. The combination of the points 35 and supporting fingers 41 with their positioning lugs thus form convenient contact sub-assemblies.

In the illustrated assembly, the reed and fixed contacts are so mounted on the frame that the motor is adapted for connection in a circuit wherein the reed and frame are grounded and the fixed contacts included in electrically independent circuits. Reference is had particularly to Figs. 3, 4, and 5 in describing the assembly of the reed and fixed contacts on the frame. The reed is placed in direct electrical contact with the frame through the face to face abutment of the frame end 13 and reed end 21, the respective apertures 19 and 24 being in registration. The reed is preferably placed on the side of the frame toward which the frame sides 11 are offset and the extent of offset is such that the reed is substantially on the center line of the offset portion of the frame side when the motor is seen from the side (see Fig. 3).

Abutting the outer face of the reed end 21 is a connecter spacer 45 having a lug 46 thereon and securing apertures 47 therein. The connecter spacer may be a stamped piece, in which case the burr side preferably abuts the reed to insure good electrical contact. Through the lug 46, the reed and frame may be connected in a circuit. Next the connecter spacer 45 is a second spacer 48 having securing apertures 49. An insulating member 50, of approximately the dimensions of the frame end 13, is apertured for mounting purposes, as at 51, and fashioned of mica or other suitable material. The insulating member follows the spacer 48 in the assembly and the base 42 of one fixed contact is positioned next the insulating member. A second and similar insulating member 52, apertured at 53, abuts the outer face of the fixed contact base 42 and the assembly on this side of the frame is completed by a double nut member 55 having tapped apertures 56 therein.

The assembly on the opposite side of the frame includes progressively, a spacer 57, apertured as at 58, an insulating member 59 similar to the insulating members 50 and 52, and apertured as at 60, the opposite fixed contact finger 41, a second insulating member 61 having apertures 62, a clamping member 63, having apertures 64, and a pair of screws 65. The apertures in each part of the assembly are all adapted to be placed in registration with apertures 19 and 24 in the frame and reed and, with the exception of the apertures 43 in the bases 42 of the fixed contacts, are only slightly larger in diameter than the shanks of the screws 65, which passing therethrough engage tapped apertures 56 in the nut 55 to secure the parts rigidly together.

The larger diametered apertures 43 in the fixed contact bases are dimensioned to provide an insulating space between the margins of the apertures and the screws. Assembly of these parts can be expeditiously made in a suitable jig or fixture, during which operation the spacing of the reed laterally relative to the frame sides 11 and longitudinally of the frame with respect to the end of the core 15 may be fixed with such accuracy that no further adjustment after assembly is required.

The method of assembling the vibratory motor described as well as the jig or other apparatus therefor forms no part of the present invention but is described and claimed in the copending application of Edward L. Barrett, Serial No. 89,051, filed July 6, 1936.

The combined thicknesses of the frame end 13, the spacer 57 and the adjacent insulating member 59 is primarily the factor which determines the spacing of the fixed contact on that side of the frame from the reed and consequently of the fixed contact point 40 from its opposed cooperating movable contact point 35. This combined dimension is predetermined to be that which will space the cooperating points 40, 35 a proper operating distance apart. On the opposite side of the frame compensation for the absence of the frame thickness is preferably made by the connecter spacer 45 and the adjacent spacer 48, the combined dimensions of these parts being equal to that of the frame end 13 and the spacer 57. In this simple manner, both fixed contact points are caused to assume an exceedingly accurate relation to the cooperating movable contact points during the single operation of assembling the parts. In practice, it has been found that frequently no final adjustment is necessary and that at most the maximum adjustment required is only a few thousandths of an inch. Whatever adjustment is necessary is obtained by slightly bending the fingers 41 to obtain the proper spacing and to insure full surface contact of the points.

Referring to Figs. 2 and 4, the assembly provides a novel means for securing the electromagnetic winding end 32 in place. This end, because of its connection with the projection 32ª on the spool end, is positioned on the center line of the adjacent frame side at the winding end of the frame. From this point the winding end is led along the frame side and is passed between the insulating members 59, 61 where these members project beyond the interposed fixed contact base. The relative dimensions insure that the winding end will be gripped firmly. Ultimately the winding end is electrically connected to an adjacent lug 44 on the contact base 42. The electromagnet winding is, therefore, connected across the frame (or ground) and one of the fixed contact points.

As may be seen in Fig. 3, the use of a frame in which the parts are coplanar or in the same plane produces an offset relationship between the outer end of the core 15 and the free end of the reed, due to mounting the reed on a side face of the frame. If the armature is secured to the side of the reed away from the core, an eccentric relation of the armature to the center of the magnetic force exerted through the face of the core is obtained by which vibration of the reed is started and continued.

The offset portions 16 in the side members of the frame are provided as a convenience to the assembler in effecting adjustment of the gap between the cooperating contact points, since otherwise the side members of the frame would be in the assembler's line of vision. It is preferred that these offset portions 16 be sufficiently long to permit the assembler to view the gap between the cooperating contacts from several angles so that every needed adjustment can be readily detected.

In considering the synchronous type of vibratory motor (Figs. 16 to 20), the same reference numerals are for the most part used where the structures are substantially identical or where only dimensional differences occur. Thus, the same basic assembly of frame, electromagnetic winding, reed (not including the movable contacts thereon) and assembly parts are employed. The primary differences are in the cooperating contact structures. Referring particularly to Fig. 19, the movable contact structure comprises a pair of transversely spaced points 66 which are supported on a common arm 67 of heavy and resilient metal stock, and the arm terminates in an enlarged base 68 having substantially the same dimensions and apertures 69 as the movable contact base 36 in the non-synchronous motor. Two such structures are assembled on the reed by rivets 70 (Fig. 17), thus providing a pair of transversely alined double contacts. Since the same reed is used for both types of motors, compensation for the variation of the natural period of vibration caused by the difference in weight of the movable contact structures may, if desired, be effected by varying the weight of the armature.

The structure shown in Fig. 20 is one of four fixed contact members employed in the synchronous motor. An elongated, somewhat resilient arm 71 tapers from a mounting base portion 72 toward the other end where it supports a fixed contact 73. The base portion has an aperture 74 therein which is larger in diameter than the aperture 19 in the base and an endwise projection 75 therefrom provides an attachment for an electrical lead and also serves as a position determining means. A projection 76 on the point end of the arm provides other position determining means.

In assembly, a fixed contact 73 is supported in operative opposition to each of the movable contact points 66 by substantially the same arrangement of assembly parts (see Fig. 17) as in the non-synchronous motor. However, since circuits involving substantially higher potentials are controlled by the synchronous motor, suitably heavier insulation, such as the double thicknesses indicated in Fig. 17 at 77, isolates the fixed contact members. Moreover, these members are transversely spaced a distance ample to prevent short circuits.

An important feature of the invention is the provision of a substantially closed magnetic flux path around the electromagnetic winding whereby high efficiency of operation is obtained. In Figs. 2, 16, and 18, it will be noted that the armature 23 extends substantially from one frame side to the other. The space between the armature ends and the frame, as well as the space between the armature and the end of the core 15 is little more than the clearance required for free relative movement of the armature. The magnetic flux, therefore, will follow the substantially closed path defined by the core 15, the end of the frame and the armature, and the vibratory reed is driven with high efficiency. The offset relationship, by virtue of the reed and frame assembly, is substantially proper without final adjustment for efficient operation. Whatever adjustment is necessary may be readily effected by simply bending the core.

In one circuit arrangement in which the non-synchronous motor is used the fixed contacts are connected one to each end of a divided primary winding of a transformer. Input of power in opposite directions is effected through the vibrating reed which is connected to the center tap of the primary winding. The electromagnetic winding 17 is in series with one section of the primary winding of the transformer and is connected to be shunted out by the closing of the contact points controlling that section, these points being those closed when the electromagnet is energized. In a circuit in which the synchronous motor is used the primary winding circuit connections may be and preferably are the same. The second pair of fixed contacts are connected one to each end of a divided secondary winding and the reed to the center tap thereof. Adjustment of the circuit by capacitance or the like produces efficient rectification.

With reference to Fig. 14, a modification of the frame, previously described, is shown as comprising a C-shaped structure formed by omitting one of the side members 11. Otherwise, the structure is substantially the same. In this form, however, the offset portion 16 may be omitted since the assembler may view the clearance between the co-operating contacts from the open side of the frame. In Fig. 15 another modified form of frame is illustrated which is generally C-shaped in form and in which a part of the frame itself becomes the core. Thus, the single side member, designated 78, supports the electromagnetic winding 79 and the narrower end member 80 constitutes a continuation of the core of the electromagnetic winding and presents a face in opposition to the reed supporting end 81 of the frame.

The present device is assembled with a supporting means which includes an enclosing casing 82 which is preferably in the form of an elongated cup-like container having an open end. It has been found that substantial benefits result from the use of a container formed of metal stock much heavier than that heretofore used. For example, a container formed of stock which is forty thousandths of an inch thick materially decreases the transmission of sound vibrations. If the container is formed of one of the relatively soft metals, such as zinc, tin, copper or lead, sound vibrations are further minimized. Zinc is a preferred metal because in a thick walled container of this type, its relatively high conductivity provides an electrostatic shield of high efficiency.

The motor is yieldably supported in such a casing by spaced pads engaging the opposite ends of the motor and formed of a suitable resilient material, such as sponge rubber. At the winding end of the motor is a pad 83 (Figs. 2, 3, 9, and 10) substantially rectangular in shape and dimensioned so that the corners bear against the inside walls of the case when the pad rests against the closed end. The pad has a pocket 84 therein, the contour of which conforms substantially to that of the winding end of the motor.

The opposite end of the motor is supported by a pad 85 (Figs. 2, 3, and 8) which fits the open end of the case but is spaced therefrom slightly by a plurality of short longitudinally extending circumferentially spaced ribs 86.

The inner side of the pad 85 is recessed, as at 87, to receive the motor end. Axially the pad has an aperture 88 to receive the lug 46 to which the ground lead is attached and the aperture near its outer end is restricted to approximately the size of the lead. In generally circular series around the aperture 88 are other similar apertures 89 arranged to receive the projections 44 or 75 to which the leads of the fixed contacts are attached. It is preferred to provide at least six apertures 89, although only four are required, since the lead arrangements to the circuit in which the motor is to be installed may vary. With additional apertures, all variations can be made without changing the pad. To facilitate the making of such variations, the extra apertures are connected by grooves 90 (Fig. 8) with those which receive the projections 44 or 75. Preferably, in order to avoid possible short circuits, the outer face of the pad has a small radial groove 91 (Fig. 2) extending from the aperture 88 to the periphery to accommodate the ground lead if the motor is to be grounded directly to the case or if the lead is to be connected to other than an axially located prong.

Provision of pads of this nature eliminates the need of separate constructions for each motor or for every circuit variation which may be encountered, thus lessening the cost of manufacture. The total separation of the pads and spaced engagement thereof with the case through the corners on pad 83 and ribs 86 on pad 85 further tend to minimize transmission of vibration and sound.

To close the open end of the case, means is provided which is simple, effective and constitutes one part of a complementary connecting device. Thus, a disk 92 (Figs. 2, 3, and 11) of fiber or other suitable insulating material, is arranged to fit snugly within the open end of the case. The disk carries a series of spaced prongs 93 of conventional type for detachable engagement with suitable sockets. Near the open end of the case (Figs. 6 and 7) generally T shaped indentations 94 are formed with the top portion 94ᵃ of the T paralleling and the leg portion 94ᵇ extending to the case edge by a stamping operation which completely severs the leg portion but only partially severs the top portion. This provides a series of inner flat shoulders against which the disk 92 rests, the edges of the disk being appropriately notched, as at 94ᶜ (Fig. 11) to clear the leg portions of the indentations. The severed ends of the leg portions are then crimped over the outer face of the disk, thus securing the disk firmly and non-rotatably in place.

Any desired arrangement of prongs on the disk may be made (see Figs. 1 and 11 as illustrating two examples) and the interchangeability of the various disks is evident. Hence, the requirements of circuit variations can be readily met merely by selection and assembly of a disk having the proper prong arrangement. With the pad structure 85 previously described, the assembly of the motor into an enclosed unit adapted for wide variations of circuit connections may be conveniently and inexpensively made.

The leads from the motor unit pass through the apertures 88 and 89 and thence into the prongs 93 where electrical connection is established. In some instances, a prong 93 is intended to connect with a ground lead, in which case the lead from the lug 46 is connected with that prong. In other circuits, the case is grounded and this may be accomplished in a novel manner by connecting the ground lead with a prong and securing to this prong on the inner side of the disk a relatively heavy lead 95 (Fig. 11) amply long to be crimped over the edge of the disk. The edge of the case is notched, as at 96, to receive the portion of the lead which projects beyond the disk periphery and a spot of solder in the notch establishes the connection.

From the foregoing it will be evident that a novel vibratory motor unit has been provided which is simple in structural details, may be quickly assembled with such accuracy that substantially final adjustment is obtained and which will operate with high efficiency. From a production standpoint, the unit is one which has materially improved characteristics and can be manufactured with uniformity and at a relatively low cost. Moreover, after assembly and final adjustment the motor structure is such that subsequent disadjustment resulting from operation is practically eliminated. An important factor contributing largely to this feature is the construction of each of the spring or resilient members, i. e., the reed and the supporting members for the fixed and movable contacts without distortion. That is to say, each member is flat and may be produced by a simple stamping operation without distortion of the metal. The definite tendency of a distorted tempered member to resume its original shape is, therefore, avoided.

We claim as our invention:

1. In a vibratory motor, the combination of a flat frame fashioned as a stamping from a piece of sheet metal into open rectangular form having end and side members located substantially in the same plane, a core piece integral with and extending from one of said end members inwardly of said frame and in the plane thereof, an electromagnetic winding secured about said core piece, a vibratory reed secured in direct electrical contact to the end member opposite the core piece and extending toward and nearly to said core piece with the plane of said reed extending along the plane of said frame so that the free end of the reed is positioned at one side of the end of said core piece, an armature on the face of said free end opposite to said core piece, contact supporting members secured to the reed supporting end of said frame on opposite sides of said reed, means for spacing said supporting members equidistantly from said reed, and cooperating contacts carried by said reed and supporting members for engagement effected by reed vibration, the side members of said frame being offset from the plane of said frame to render the gaps between the contact points readily visible to an assembler from the side of the frame.

2. In a vibratory motor, the combination of a flat frame fashioned as a stamping from a piece of sheet metal into open rectangular form having end and side members located substantially in the same plane, an integral core extending from one of said end members inwardly of said frame and in the plane thereof, an electromagnetic winding secured about said core, a vibratory reed secured in direct electrical contact to the end member opposite the core and extending toward and nearly to said core with the plane of said reed extending along the plane of said frame so that the free end of the reed is positioned at one side of the end of said core, an armature carried by said reed at one side of said core, contacts carried by said reed, and cooperating contacts supported from said frame.

3. In a vibratory motor, the combination of a flat frame fashioned from a piece of magnetically permeable sheet metal into open rectangular form having end and side members located substantially in the same plane, an integral core extending from one of said end members inwardly of said frame and in the plane thereof, an electromagnetic winding secured about said core, a vibratory reed secured to the end member opposite the core and extending toward and nearly to said core with the plane of said reed extending along the plane of said frame, said reed being dimensioned at least at its free end to extend nearly from one side member to the other, an armature on the free end of said reed extending nearly from one side member to the other and having a clearance permitting armature movement past said side members, said armature being of magnetic permeable material to complete a substantially closed magnetic path which includes the core and intermediate portions of the frame, and cooperating contacts supported by said frame and reed.

4. In a vibratory motor the combination of a plane frame, a vibratory reed having one end abutting the face of one side of said frame to extend substantially parallel to the plane of said frame, spacer means on the outer face of said end of said reed to compensate for the thickness of said frame, insulated contact members on the outer side of said spacer and on the side of said frame opposite to said reed, and means for securing said parts together.

5. In a vibratory motor, the combination of a flat frame fashioned from a piece of sheet metal into centrally open rectangular form having end and side members located substantially in the same plane, an integral core extending from one of said end members inwardly of said frame and in the plane thereof, an electromagnetic winding secured about said core, a vibratory reed mounted on the end member opposite said core and extending into cooperative relation thereto, and cooperating contacts supported respectively by said frame and reed.

6. In a vibratory motor, the combination of a flat frame having a closed U shaped end section of magnetic permeable material, a core for an electromagnetic winding extending inwardly from the base of said U shaped section and located substantially on the plane of said frame, a winding about said core, a vibratory reed disposed for movement in response to intermittent energizations of said winding, and an armature of magnetic permeable material on said reed extending from one side of said frame to the other and past the active face of said core, said armature being spaced from said frame and face to clear them in the relative movement thereof but being sufficiently close thereto to complete a substantially closed magnetic path around said winding.

7. A frame for a vibratory motor comprising a member formed from a single sheet of metal and including a supporting element for a reed, a core for an electromagnetic winding opposed to said element, and a connecter extending between said element and core, said parts being located in substantially the same plane.

8. A frame for a vibratory motor comprising a flat member embodying a generally C shaped structure in which one end constitutes an energizable pole piece, and the opposite end a support for a vibratory reed.

9. A frame for a vibratory motor comprising a flat member embodying a generally C shaped structure in which one end constitutes a support for a vibratory reed, and an electromagnetic winding core on the opposite end extending in a direction longitudinally of said structure.

10. A frame for a vibratory motor comprising an open rectangularly shaped structure having one end adapted for the support of a reed and the opposite end including a core piece extending substantially along the longitudinal line of said structure, said parts being coplanar and the sides of said structure between the ends being slightly offset out of the plane of the remaining structure.

11. A frame for a vibratory motor comprising an open structure having one end adapted for the support of a reed and the opposite end including an integral electromagnetic winding core extending substantially along the longitudinal line of said structure, said parts being coplanar.

12. In a vibratory motor device, the combination of a flat center open frame including a magnetic core member and an opposed support, means for energizing said member, and a reed mounted on said support for movement in response to intermittent energization of said member and along a line generally at right angles to the flat plane of said frame.

13. In a vibratory motor device, the combination of a flat frame having a center opening therein and a reed mounted thereon to extend into the open center and paralleling the flat plane of the frame for vibratory movement generally in a direction at right angles to said plane.

14. In a vibratory motor, the combination of a frame having an energizable pole piece, a supporting element and a connecting part on substantially the same flat plane, and a flat reed supported in face-to-face engagement with said supporting element to extend toward said pole piece.

15. In a vibratory motor, the combination of a flat reed, means for driving said reed including the core of an electromagnetic winding, and means for supporting said reed and said core in operative relation including a flat frame member extending along the side edge of said reed and lying in a plane paralleling the same.

16. In a vibratory motor, the combination of a flat resilient reed, means for driving said reed, and reed supporting means including a flat frame having side members extending along opposite side edges of said reed and lying in a plane paralleling the same.

17. In a vibratory motor, the combination of a frame having an energizable pole piece thereon, and a reed disposed for movement in response to energizations of said pole piece and having one end secured to said frame, said reed comprising an elongated resilient member having a center opening for modifying the flexing characteristics thereof extending substantially from one end of the reed to the other, and contact supporting means spanning said opening intermediate the ends of said reed.

18. In a device of the character described, the combination of a vibratory motor, an enclosing case therefor having an open end, said case having portions thereof struck inwardly near the open end to provide a series of circumferentially alined outwardly facing shoulders, means including a closure adapted to fit snugly within the open end of said case and rest against said shoulders for maintaining said vibratory motor in position within said case, said case having portions thereof overturned to bind said closure in such position thereby aiding in preventing displacement of said motor due to the vibratory operation thereof, and connecter means on said closure.

19. In a device of the character described, the combination of a vibratory motor, an enclosing case therefor having an open end, said case having portions thereof struck inwardly near the open end to provide a series of circumferentially alined outwardly facing shoulders and having other portions severed and struck inwardly to form free nibs extending from the margin of the open end, and means including a closure adapted to fit snugly within the open end of said case and rest against said shoulders for maintaining said vibratory motor in position within said case, said closure being peripherally notched to clear said free nibs, said nibs being adapted to be overturned when said closure abuts said shoulder to secure said closure against movement relative to said case and thereby aiding in preventing displacement of said motor due to the vibratory operation thereof.

20. In a vibratory motor the combination of a frame having an energizable pole piece thereon, a pair of laterally flexible portions of resilient sheet metal arranged in parallel relation in a common plane, means for supporting adjacent ends of said portions of resilient sheet metal in spaced relation on said frame, the opposite ends thereof being freely movable, an armature carried by said opposite ends disposed in operative relation with respect to said pole piece, and contact supporting means extending between said portions of sheet metal intermediate the ends thereof.

21. A one-piece open rectangular supporting frame structure for use in a vibratory motor comprising, longitudinally extending side members and integral opposed end members fashioned as a stamping from a single piece of sheet material, and a core piece integral with and extending from one of said end members inwardly of said frame and in the plane thereof, the other of said end members having apertures therein adapted to receive securing means for mounting the fixed end of a vibratory reed thereon, at least one of said side members having a portion thereof offset from the plane of said apertured end member to provide a space for the inspection of contacts carried by the reed.

22. A one-piece open rectangular supporting frame structure for use in a vibratory motor comprising, longitudinally extending side members and integral opposed end members fashioned as a stamping from a single piece of sheet material, and a core piece integral with and extending from one of said end members inwardly of said frame and in the plane thereof, the other of said end members having apertures therein adapted to receive securing means for mounting the fixed end of a vibratory reed thereon.

23. A relatively fixed contact sub-assembly adapted for use in a circuit controlling vibratory motor comprising, in combination, a flat elongated sheet metal contact supporting finger having an enlarged base portion with an aperture to receive a securing means for holding the support fixedly in position, a contact point rigidly secured to the outer end portion of said supporting finger and a plurality of integral assembly positioning lugs extending laterally from said base portion at spaced points thereon.

24. A relatively fixed contact sub-assembly adapted for use in a circuit controlling vibratory motor comprising, in combination, an elongated conductive supporting member, a contact point rigidly secured to one side of said supporting member, and a plurality of integral assembly positioning lugs extending laterally from said supporting member at spaced points thereon.

EDWARD L. BARRETT.
MAX J. MANAHAN.